(12) United States Patent
Chen et al.

(10) Patent No.: US 9,942,888 B2
(45) Date of Patent: Apr. 10, 2018

(54) SENDING METHOD AND APPARATUS FOR ENHANCED PHYSICAL DOWNLINK CONTROL CHANNEL

(75) Inventors: Yijian Chen, Shenzhen (CN); Bo Dai, Shenzhen (CN); Zhisong Zuo, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 897 days.

(21) Appl. No.: 14/358,206

(22) PCT Filed: Jun. 27, 2012

(86) PCT No.: PCT/CN2012/077600
§ 371 (c)(1),
(2), (4) Date: Sep. 17, 2014

(87) PCT Pub. No.: WO2013/071757
PCT Pub. Date: May 23, 2013

(65) Prior Publication Data
US 2015/0049685 A1   Feb. 19, 2015

(30) Foreign Application Priority Data
Nov. 14, 2011   (CN) .......................... 2011 1 0360142

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/0028* (2013.01); *H04L 1/0036* (2013.01);
(Continued)

(58) Field of Classification Search
None
See application file for complete search history.

(56) References Cited

U.S. PATENT DOCUMENTS

2010/0120442 A1*  5/2010  Zhuang .............. H04B 7/15507
                                                    455/450
2011/0044391 A1*  2/2011  Ji .......................... H04L 5/0007
                                                    375/260
(Continued)

FOREIGN PATENT DOCUMENTS

CN          102215094        10/2011

OTHER PUBLICATIONS

English Translation of International Search Report of International Application No. PCT/CN2012/077600, dated Oct. 18, 2012; 4 pages.
(Continued)

*Primary Examiner* — Derrick Ferris
*Assistant Examiner* — Manuel Rangel

(57) ABSTRACT

Disclosed in the present disclosure are a sending method and apparatus for enhanced physical downlink control channel. The method comprises: a start position of the ePDCCH in a subframe is determined according to a high-level signaling and/or preset rule; and a pilot signal for ePDCCH and data carried on the ePDCCH are sent. By applying the present disclosure, the interference between the ePDCCH and the downlink control channel is reduced, and the efficiency of downlink transmission is improved.

14 Claims, 10 Drawing Sheets

(51) Int. Cl.
H04L 1/00 (2006.01)
H04L 27/26 (2006.01)
(52) U.S. Cl.
CPC ............ *H04L 5/005* (2013.01); *H04L 5/0051* (2013.01); *H04L 5/0053* (2013.01); *H04L 27/2613* (2013.01); *H04L 5/001* (2013.01); *H04L 5/0023* (2013.01)

(56) References Cited

U.S. PATENT DOCUMENTS

| | | | | |
|---|---|---|---|---|
| 2011/0249633 | A1* | 10/2011 | Hong | H04L 5/0053 370/329 |
| 2013/0003663 | A1* | 1/2013 | Blankenship | H04L 5/0053 370/329 |
| 2013/0044693 | A1* | 2/2013 | Lindh | H04L 5/0026 370/329 |
| 2013/0121304 | A1* | 5/2013 | Nory | H04L 1/1861 370/330 |
| 2014/0192759 | A1* | 7/2014 | Son | H04W 72/042 370/329 |

OTHER PUBLICATIONS

PCT Publication and International Search Report of International Application No. PCT/CN2012/077600; 42 pages.

* cited by examiner

… (1) …

SENDING METHOD AND APPARATUS FOR ENHANCED PHYSICAL DOWNLINK CONTROL CHANNEL

TECHNICAL FIELD

The present disclosure relates to the field of communications, in particular to a sending method and apparatus for enhanced physical downlink control channel (ePDCCH for short).

BACKGROUND

The technique of Orthogonal Frequency Division Multiplexing (OFDM for short) is a multi-carrier modulation communication technique in nature, and this technique is one of the core techniques in the 4th generation mobile communication (4G). In the frequency domain, the multipath channel on OFDM system presents the characteristic of frequency selective fading. In order to overcome this kind of fading, in the frequency domain the channel should be divided into a plurality of sub-channels. The frequency spectrum characteristic of each of the sub-channels is nearly flat, and sub-channels of OFDM are mutually orthogonal; therefore, the frequency spectrums of the sub-channels are allowed to be mutually overlapped, thus being able to use the frequency spectrum resource to a large extent.

The technique of Multiple-Input Multiple-Output (MIMO for short) can increase the system capacity, improve the transmission performance, and converge with other physical layer techniques very well, thus becoming the key technique of beyond 3G (B3G) and 4G.

The Long Term Evolution (LTE for short) system and LTE-advance are important plans of 3rd generation partnership project. The OFDM technique and the MIMO technique are used. Simple introduction will be made about the LTE and LTE-A systems hereafter.

FIG. 1 and FIG. 2 are respectively schematic diagrams of a frame structure for LTE/LET-A in frequency division duplex (FDD for short) mode and in time division duplex (TDD for short) mode.

For the frame structure in FDD mode shown in FIG. 1, one radio frame having a length of 10 ms consists of twenty time slots of 0.5 ms in length which are numbered from 0 to 19; a subframe i of 1 ms in length consists of time slots $2i$ and $2i+1$.

For the frame structure in TDD mode shown in FIG. 2, one radio frame of 10 ms in length consists of two half-frames of 5 ms in length, and one half-frame consists of five subframes of 1 ms in length. The subframe i consists of two time slots $2i$ and $2i+1$ of 0.5 ms in length.

In the two kinds of frame structures, when a normal cyclic prefix (Normal CP) is used in the system, one time slot consists of seven uplink/downlink symbols; and when an extended CP is used in the system, one time slot consists of six uplink/downlink symbols. The above-mentioned symbols are OFDM symbols.

One resource element (RE for short) is a OFDM sub-carrier during one OFDM symbol interval, and a downlink resource block (RB) consists of 12 consecutive sub-carriers and 14 (12 in case of an extended cyclic prefix) consecutive OFDM symbols, wherein the RB is 180 kHz in the frequency domain, and is the duration of one time slot in the time domain, as shown in FIG. 3 (a 5M system). When resource allocation is performed in an LTE/LTE-A system, the allocation is performed with a resource block as a base unit.

The transmission scheme of the LTE/LTE-A system is as shown table 1 below:

TABLE 1

The schematic table of the transmission scheme of the LTE/LTE-A system

| | |
|---|---|
| Single-antenna port | Demodulated based on CRS or demodulated based on DRS |
| Transmit diversity scheme | Demodulated based on CRS |
| Large delay CDD scheme | Demodulated based on CRS |
| Closed-loop spatial multiplexing | Demodulated based on CRS |
| Multi-user MIMO scheme | Demodulated based on CRS |
| Dual layer scheme | Demodulated based on UE specific RS |
| Up to 8 layer transmission | Demodulated based on UE specific RS |

Where the modes of Single-antenna port, Transmit diversity scheme, Large delay CDD scheme, Closed-loop spatial multiplexing, and Multi-user MIMO scheme, etc. support an MIMO application having four antennas to the greatest extent; therefore, cell common reference signal (CRS for short) is defined in protocol to serve for these transmission techniques. The common reference signal is sent in each non-MBSFN subframe. Corresponding antenna port #0, antenna port #1, antenna port #2 and antenna port #3 adopt the means of cell common reference signals (CRS) with full bandwidth. The function of the cell common reference signal comprises measuring the quality of the downlink channel and evaluating (demodulating) the downlink channel. If the cyclic prefix is a normal cyclic prefix, the positions of these common reference signals in a physical resource block are as shown in FIG. 4. If the cyclic prefix is an extended cyclic prefix, the positions of these common reference signals in a physical resource block are as shown in FIG. 5. In FIG. 4 and FIG. 5, the abscissa 1 represents the index of the OFDM symbol, and C1, C2, C3 and C4 correspond to logical port #0, logical port #1, logical port #2 and logical port #3 for the cell common reference signal.

It should be noted that there are some special cases when sending CRS, for example, in an MBSFN subframe, only the CRSs contained in the first two OFDM symbols needs to be sent; and in some newly introduced carrier types, no CRS need to be sent.

In addition, there are UE-specific reference signals, the reference signals are only transmitted in the time and frequency domains where the UE-specific physical downlink shared channel (PDSCH for short) is, mainly for supporting two closed-loop MIMO techniques of Dual layer scheme and Up to 8 layer transmission.

At present, no effective solution has been proposed aimed at that the sending of ePDCCH causes intra-cell interference in the control channels in related art yet.

SUMMARY

A sending method and apparatus for ePDCCH are proposed in the present disclosure aimed at the problem that the sending of ePDCCH causes intra-cell interference in the control channels in related art.

According to one aspect of the present disclosure, a sending method for ePDCCH is provided, which comprises: determining a start position of the ePDCCH in a subframe according to a high-level signaling and/or a preset rule; and sending a pilot signal for the ePDCCH and data carried on the ePDCCH.

Preferably, before sending the pilot of the ePDCCH, the method further comprises: determining the pilot signal for the ePDCCH according to at least one of the following: a transmission scheme of the ePDCCH and a type of the subframe where the ePDCCH is, wherein the transmission scheme comprises: a transmit diversity scheme, and a single-antenna port or multi-antenna port transmission scheme.

Preferably, determining the pilot signal for the ePDCCH according to the at least one of the following: the transmission scheme of the ePDCCH and the type of the subframe where the ePDCCH is comprises:

If the transmission scheme of the ePDCCH is the transmit diversity scheme, determining a cell-specific reference signal as the pilot for the ePDCCH;

the transmission scheme of the ePDCCH is the single-antenna port or multi-antenna port transmission scheme, determining a UE-specific reference signal as the pilot for the ePDCCH;

if the type of the subframe where the ePDCCH is an multicast broadcast single frequency network (MBSFN) subframe, determining the UE-specific reference signal as the pilot signal of the ePDCCH;

if the type of the subframe where the ePDCCH is a predetermined subframe, determining the cell-specific reference signal as the pilot signal for the ePDCCH, wherein the predetermined subframe comprises: a non-multicast broadcast single frequency network (MBSFN) subframe and non-special subframe;

if the transmission scheme of the ePDCCH is the transmit diversity scheme, and the ePDCCH is transmitted on the predetermined subframe on a compatible component carrier, determining a cell-specific reference signal as the pilot signal for the ePDCCH;

if the transmission scheme of the ePDCCH is the transmit diversity scheme and the ePDCCH is transmitted on a non-compatible carrier subframe having no cell-specific reference signal, determining the UE-specific reference signal as the pilot signal for the ePDCCH; and if the transmission scheme of the ePDCCH is the transmit diversity scheme and the ePDCCH is transmitted on MBSFN subframes on a compatible component carrier, determining the UE-specific reference signal as the pilot signal for the ePDCCH.

Preferably, the UE-specific reference signal is one of the following: a reference signal supporting a two-antenna port, a reference signal supporting a four-antenna port, a shortened cell-specific reference signal, wherein the shortened cell-specific reference signal is a cell-specific reference signal contained in at least one physical resource block where the ePDCCH is when sending the cell-specific reference signal.

Preferably, an initial scrambling code value generated by sequences of the UE-specific reference signal is a predetermined value or is configured according to a high-level signaling.

Preferably, before sending data carried on the ePDCCH, the method further comprises: configuring data power on at least one sub-carrier element at an antenna port.

Preferably, configuring the data power on the at least one sub-carrier element at the antenna port comprises one of the following:

configuring a ratio of the data power on the at least one sub-carrier element at the antenna port to pilot power, which is corresponding to the antenna port, on the at least one sub-carrier element to be h1, wherein the value of h1 is configured by a high-level signaling;

if the ePDCCH is in the single-antenna port or multi-antenna port transmission scheme, configuring the ratio of the data power on the at least one sub-carrier element at the antenna port to the pilot power, which is corresponding to the antenna port, on the at least one sub-carrier element, to be h1, wherein h1 is a predetermined value;

configuring the data power on the at least one sub-carrier element at the antenna port to be equal to the pilot power, which is corresponding to the antenna port, on the sub-carrier element, if the following conditions are satisfied: the ePDCCH is in the transmit diversity scheme, the UE-specific reference signal is the shortened cell-specific reference signal, the subframe, where the ePDCCH is, is the MBSFN subframe, and the cell-specific reference signal exists on the first two Orthogonal Frequency Division Multiplexing (OFDM) symbols of the MBSFN subframe;

if the following conditions are satisfied, configuring the ratio of the data power on the sub-carrier element at the antenna port to the pilot power, which is corresponding to the antenna port, on the sub-carrier element to be h1, and configuring power of the shortened cell-specific reference signal and power of a corresponding cell-specific reference signal to be h2, wherein h1 and h2 are configured by one of the following means: h1 and h2 being configured by a signaling; h1 being a predetermined value, h2 being configured by a high-level signaling; and h1 being configured by a signaling, and h2 being a predefined value;

configuring the ratio of the data power on the sub-carrier element at the antenna port to the pilot power, which is corresponding to the antenna port, on the sub-carrier element to be h1, which is a predefined value or is configured by a high-level signaling, if the following conditions are satisfied: the ePDCCH is in the transmit diversity scheme, the UE-specific reference signal is a shortened cell-specific reference signal, and no cell-specific reference signal is on the subframe where the ePDCCH is.

Preferably, determining the start position of the ePDCCH in the subframe according to the high-level signaling and/or the preset rule comprises one of the following:

if the ePDCCH is only in a second time slot, the start position of the ePDCCH being a First Orthogonal Frequency Division Multiplexing (OFDM) symbol of the second time slot;

if the ePDCCH is only in the first time slot, the start position of the ePDCCH being the same as a start position of a first component carrier of a Specific Physical Downlink Shared Channel for a first user equipment (UE), wherein the first component carrier is a component carrier where the ePDCCH is, and the first UE is a UE corresponding to the ePDCCH;

if the ePDCCH is in the first time slot, the start position of the ePDCCH being obtained according to a first high-level signaling; and if the ePDCCH is in the first time slot, the start position of the ePDCCH being obtained according to the first high-level signaling when a first predetermined condition is satisfied, and the start position of the ePDCCH being obtained according to a second high-level signaling when a second predetermined condition is satisfied.

Preferably, the first predetermined condition and the second predetermined condition comprise one of the following:

the first predetermined condition being that the UE corresponding to the ePDCCH does not perform, in the component carrier where the ePDCCH is, an operation of detecting a control area bearing a physical downlink control channel; and the second predetermined condition being that the UE corresponding to the ePDCCH performs, in the component carrier where the ePDCCH is, an operation of detecting a control area bearing a physical downlink control channel;

the first predetermined condition being that no control area bearing a physical downlink control channel is on the component carrier where the ePDCCH is; and the second predetermined condition being that a control area bearing a physical downlink control channel is on the component carrier where the ePDCCH is; and the first predetermined condition being that the UE corresponding to the ePDCCH does not perform, in the component carrier where the ePDCCH is, an operation of detecting a physical control format indication channel; and the second predetermined condition being that the UE corresponding to the ePDCCH performs, in the component carrier where the ePDCCH is, an operation of detecting a physical control format indication channel.

Preferably, the value of the first high-level signaling comprises:

if a system bandwidth of the component carrier is smaller than or equal to 10 physical resource blocks, the value of the high-level signaling is one of the following: #0, #1, #2, #3; #0, #2, #3, #4; or #1, #2, #3, #4; and if the system bandwidth of the component carrier is greater than 10 physical resource blocks, the value of the high-level signaling is: #0, #1, #2, or #3.

Preferably, the value of the second high-level signaling comprises:

if the system bandwidth of the component carrier is smaller than or equal to 10 physical resource blocks, the high-level signaling indicates the start position to be #2, #3, #4, or the start position is obtained via control format indication information carried by the physical downlink control format indication channel; and if the system bandwidth of the component carrier is greater than 10 physical resource blocks, the high-level signaling indicates the start position to be #1, #2, #3, or the start position is obtained via control format indication information carried by the physical downlink control format indication channel.

Preferably, if the ePDCCH is in the first time slot, an end position of the ePDCCH is the last OFDM symbol in the first time slot or the last OFDM symbol in the second time slot.

Preferably, if the ePDCCH is only in the second time slot, an end position of the ePDCCH is the last OFDM symbol of the second time slot.

According to another aspect of the present disclosure, a sending apparatus for ePDCCH data is provided, comprising a first determination configured to determine a start position of the ePDCCH in a subframe according to a high-level signaling and/or a preset rule; and a sending module configured to send a pilot signal for the ePDCCH and data carried on the ePDCCH.

Preferably, the apparatus further comprises a second determination module configured to determine the pilot signal for the ePDCCH according to at least one of the following:

a transmission scheme of the ePDCCH and a type of the subframe where the ePDCCH is, wherein the transmission scheme comprises: a transmit diversity scheme and a single-antenna port or multi-antenna port transmission scheme.

Preferably, the above-mentioned apparatus further comprises: a configuration module configured to configure a data power on at least one sub-carrier element at the antenna port.

By determining a start position of ePDCCH in a subframe, the problem that the intra-cell interference in the control channels caused by sending ePDCCH in related art is solved, thus achieving the effect of reducing the transmission interference in the control channels.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

Figure 1:
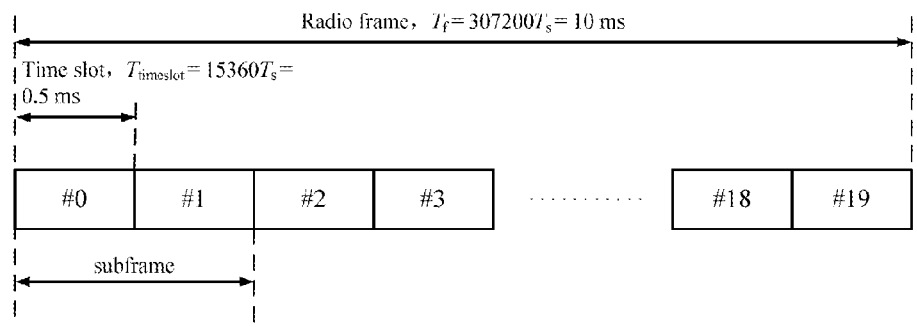
FIG. 1 is a schematic diagram of a frame structure for LTE/LTE-A system in the FDD mode according to the related art.
Figure 2:
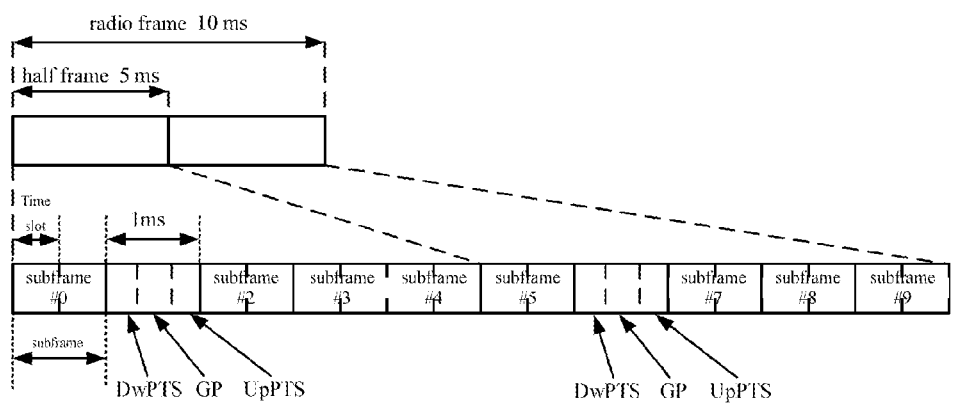
FIG. 2 is a schematic diagram of a frame structure for LTE/LTE-A system of TDD mode according to the related art.
Figure 3:
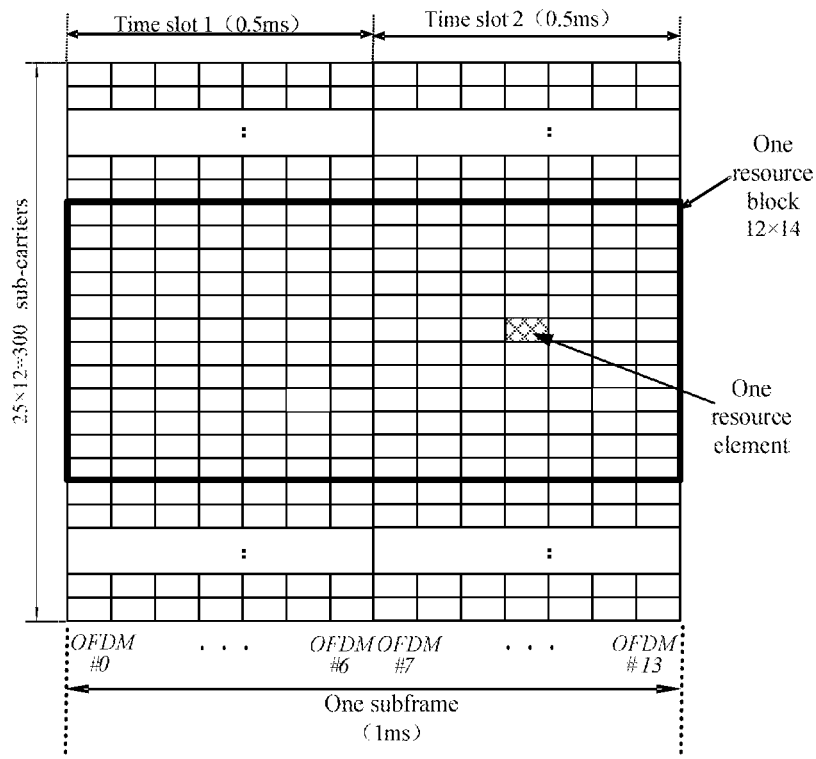
FIG. 3 is a schematic diagram of a resource block for LTE/LTE-A system according to the related art.

It shall be understood that the embodiments of the present application and the features of the embodiments can be combined with each other if there is no conflict. The preferred embodiments are described in conjunction with the drawings as follows.

Step S602: a start position of the ePDCCH in a subframe is determined according to a high-level signaling and/or a preset rule.

Step S604: a pilot signal for the ePDCCH and data carried on the ePDCCH are sent.

By the above-mentioned steps, a start position of the ePDCCH in a subframe is determined according to a high-level signaling and/or a preset rule, interference caused by the sending of ePDCCH and the existing PDCCH is eliminated. The problem that intra-cell interference in the control channels is caused by sending ePDCCH is solved, and the efficiency of downlink transmission is improved.

As a preferred embodiment, before step S604, the method further comprises: determining the pilot of the ePDCCH according to at least one of the following: a transmission scheme of the ePDCCH and a type of the subframe where the ePDCCH is, wherein the transmission scheme comprises a transmit diversity scheme, and the transmission scheme further comprises a single-antenna port or multi-antenna port transmission scheme. The pilot signal for the ePDCCH is determined by the transmission scheme and/or the type of the subframe in this embodiment, so that the accuracy rate for determining the pilot signal is improved.

Preferably, determining the pilot of the ePDCCH in the above-mentioned embodiment can be implemented via the following methods:

method 1: if the transmission scheme of the ePDCCH is the transmit diversity scheme, a cell-specific reference signal is determined as the pilot signal for the ePDCCH;

method 2: if the transmission scheme of the ePDCCH is the single-antenna port or multi-antenna port transmission scheme, a UE-specific reference signal is determined as the pilot signal for the ePDCCH;

method 3: if the type of the subframe where the ePDCCH is an non-multicast broadcast single frequency network (MBSFN) subframe, the UE-specific reference signal is determined as the pilot signal for the ePDCCH;

method 4: if the type of the subframe where the ePDCCH is the predetermined subframe, the cell-specific reference signal is determined as the pilot signal for the ePDCCH, wherein the predetermined subframe comprises: a non-MBSFN subframe and non-special subframe;

method 5: if the transmission scheme of the ePDCCH is the transmit diversity scheme and the ePDCCH is transmitted on the predetermined subframe on a compatible component carrier, the cell-specific reference signal is determined to be the pilot signal for the ePDCCH;

method 6: if the transmission scheme of the ePDCCH is the transmit diversity scheme and the ePDCCH is transmitted on a non-compatible carrier subframe having no cell-specific reference signal, the UE-specific reference signal is determined to be the pilot signal for the ePDCCH; and method 7: if the transmission scheme of the ePDCCH is the transmit diversity scheme and the ePDCCH is transmitted on an MBSFN subframe on a compatible component carrier, the UE-specific reference signal is determined to be the pilot signal for the ePDCCH.

By above-mentioned seven methods, the pilot signal for the ePDCCH is determined respectively when the transmission scheme of ePDCCH is the transmit diversity scheme or the single-antenna port or multi-antenna port transmission scheme, so that the flexibility for determining the ePDCCH is improved.

Preferably, the UE-specific reference signal is one of the following: a reference signal supporting a two-antenna port, a reference signal supporting a four-antenna port, a shortened cell-specific reference signal, wherein the shortened cell-specific reference signal is a cell-specific reference signal contained by a physical resource block, where the ePDCCH is, when it is sent according to the cell-specific reference signal. For a reference signal supporting a two-antenna antenna port, antenna port 7 and antenna port 8 in R10 may be used; and for a reference signal supporting a four-antenna antenna port, antenna port 7, antenna port 8, antenna port 9 and antenna port 10 in R10 may be used.

Preferably, an initial scrambling code value generated by the sequences of the above-mentioned UE-specific reference signal is a predetermined value or is configured according to a high-level signaling. The initial scrambling code value is obtained by means of predetermination or high-level signaling configuration in this preferred embodiment, so that the complexity that the UE detects the sequences, is reduced, the selection of the UE reference signal sequences is coordinated and the interference between the UE reference signals is reduced.

In another preferred embodiment, before sending data carried on the ePDCCH in the step S604, the method further comprises: the data power on at least one sub-carrier element at an antenna port is configured. In this preferred embodiment, when the ePDCCH data is sent, the data power is configured, so that the efficiency of the sending of the ePDCCH is improved, and the performance of the downlink channel is improved.

In a preferred embodiment, one of the following methods can be used to configure the data power on the at least one sub-carrier element at the antenna port.

Method 1: a ratio of the data power on the at least one sub-carrier element at the antenna port to pilot power, which is corresponding to the antenna port, on the at least one sub-carrier element is configured to be h1, wherein the value of h1 is configured by a high-level signaling.

Method 2: if the ePDCCH is in the single-antenna port or multi-antenna port transmission scheme, the ratio of the data power on the at least one sub-carrier element at the antenna port to the pilot power, which is corresponding to the antenna port, on the at least one sub-carrier element, is configured to be h1, wherein h1 is a predefined value.

Method 3: if the type of the subframe where the ePDCCH is multicast broadcast single frequency network (MBSFN) subframe, the UE-specific reference signal is determined as the pilot signal for the ePDCCH.

Method 4: if the type of the subframe where the ePDCCH is the predetermined subframe, the cell-specific reference signal is determined as the pilot signal for the ePDCCH, wherein the predetermined subframe comprises: a non-multicast broadcast single frequency network (MBSFN) subframe and non-special subframe.

Method 5: if the transmission scheme of the ePDCCH is the transmit diversity scheme and the ePDCCH is transmitted on the predetermined subframe on a compatible component carrier, the cell-specific reference signal is determined to be the pilot signal for the ePDCCH.

Method 6: if the transmission scheme of the ePDCCH is the transmit diversity scheme and the ePDCCH is transmitted on a non-compatible carrier subframe having no cell-specific reference signal, the UE-specific reference signal is determined to be the pilot signal for the ePDCCH.

Method 7: if the transmission scheme of the ePDCCH is the transmit diversity scheme and the ePDCCH is transmitted on an MBSFN subframe on a compatible component carrier, the UE-specific reference signal is determined to be the pilot signal for the ePDCCH.

By above-mentioned 7 methods, the pilot signal for the ePDCCH is determined respectively when the transmission scheme of ePDCCH is the transmit diversity scheme or the single-antenna port or multi-antenna port transmission scheme, so that the flexibility for determining the ePDCCH is improved.

Preferably, the UE-specific reference signal is one of the following: a reference signal supporting a two-antenna port, a reference signal supporting a four-antenna port, a shortened cell-specific reference signal wherein the shortened cell-specific reference signal is a cell-specific reference signal contained by a physical resource block, where the ePDCCH is, when it is sent according to the cell-specific reference signal.

It should be noted that when the application scenario is that no cell-specific reference signal is sent (or no cell-specific reference signal is sent on the second time slot), the shortened cell-specific reference signal is a reference signal obtained by intercepting the cell-specific reference signal contained in the physical resource block where the ePDCCH is, if assuming that there is a cell-specific reference signal being sent.

Preferably, for a reference signal supporting a two-antenna port, antenna port 7 and antenna port 8 in R10 can be used; and for a reference signal supporting a four-antenna port, antenna port 7, antenna port 8, antenna port 9 and antenna port 10 in R10 can be used.

Preferably, an initial scrambling code value generated by the sequences of the above-mentioned UE-specific reference signal is a predetermined value or is configured according to the high-level signaling.

In another preferred embodiment, before sending data carried on the ePDCCH in the step S604, the method further comprises: the data power on at least one sub-carrier element at an antenna port is configured for the data. In this preferred embodiment, when ePDCCH data is sent, the data power is configured, so that the efficiency of the sending of the ePDCCH is improved, and the performance of the downlink channel is improved.

In a preferred embodiment, one of the following methods can be used to configure the data power on the at least one sub-carrier element at the antenna port.

Method 1: a ratio of the data power on the at least one sub-carrier element at the antenna port to pilot power at least one sub-carrier element corresponding to the antenna port is configured to be h1, wherein the value of h1 is configured by a high-level signaling.

Method 2: if the ePDCCH is in the single-antenna port or multi-antenna port transmission scheme, the ratio of the data power on the at least one sub-carrier element at the antenna port to the pilot power of the sub-carrier element corresponding to the antenna port is configured to be h1, wherein h1 is a predefined value.

Method 3: the data power on the at least one sub-carrier element at the antenna port is configured to be equal to the pilot power, which is corresponding to the antenna port, on the sub-carrier element if the following conditions are satisfied: the ePDCCH is in the transmit diversity scheme, the UE-specific reference signal is the shortened cell-specific reference signal; the subframe, where the ePDCCH is, is an MBSFN subframe, and the cell-specific reference signal exists on the first two OFDM symbols of the MBSFN subframe.

Method 4: when the following conditions are satisfied, the ratio of the data power on the at least one sub-carrier element at the antenna port to the pilot power on the sub-carrier element corresponding to the antenna port is configured to be h1, and the power of the shortened cell-specific reference signal and the corresponding cell-specific reference signal is configured to be h2. Preferably, the data is in high-order modulation mode, and high-order modulation modes comprises modes of 16QAM, 64QAM, 128QAM, etc. h1 and h2 are configured by one of the following means: h1 and h2 being configured by a signaling; h1 being a predetermined value, and h2 being configured by a high-level signaling; and h1 being configured by a signaling, and h2 being a predefined value.

Method 5: the ratio of the data power on the at least one sub-carrier element at the antenna port to the pilot power on the sub-carrier element corresponding to the antenna port is configured to be h1, which is a predefined value or is configured by a high-level signaling if the following conditions are satisfied: the ePDCCH is in the transmit diversity scheme; the UE-specific reference signal is a shortened cell-specific reference signal, and no cell-specific reference signal is on the subframe where the ePDCCH is.

In another relatively preferred embodiment, determining the start position of the ePDCCH in the subframe according to the high-level signaling or the preset rule in step S602 comprises the following methods:

method 1: if the ePDCCH is only in the second time slot, the start position of the ePDCCH is the first OFDM symbol of the second time slot, and an end position of the ePDCCH is the last OFDM symbol of the second time slot;

method 2: if the ePDCCH is in the first time slot, the start position of the ePDCCH is the same as a start position of a first component carrier of a Specific Physical Downlink Shared Channel for a first user equipment (UE), wherein the first component carrier is a component carrier where the ePDCCH is, and the first UE is a UE corresponding to the ePDCCH;

method 3: if the ePDCCH is in the first time slot, the start position of the ePDCCH is obtained according to a first high-level signaling;

method 4: if the ePDCCH is in the first time slot, the start position of the ePDCCH is obtained according to the first high-level signaling when the first predetermined condition is satisfied, and the start position of the ePDCCH is obtained according to a second high-level signaling when the second predetermined condition is satisfied.

Preferably, the first predetermined condition and the second predetermined condition comprise one of the following combinations:

combination 1: the first predetermined condition is that the UE corresponding to the ePDCCH does not perform, in the component carrier where the ePDCCH is, an operation of detecting a control area bearing a physical downlink control channel; and the second predetermined condition is that the UE corresponding to the ePDCCH performs, in a component carrier where the ePDCCH is, an operation of detecting a control area bearing a physical downlink control channel.

Combination 2: the first predetermined condition is that no control area bearing a physical downlink control channel is on the component carrier where the ePDCCH is; and the second predetermined condition is that a control area bearing a physical downlink control channel is on the component carrier where the ePDCCH is.

Combination 3: the first predetermined condition is that the UE corresponding to the ePDCCH does not perform, in the component carrier where the ePDCCH is, an operation of detecting a physical control format indication channel; and the second predetermined condition is that the UE corresponding to the ePDCCH performs, in a component carrier where the ePDCCH is, an operation of detecting a physical control format indication channel.

In this preferred embodiment, by the above-mentioned three combinations, whether the UE corresponding to the ePDCCH performs, in the component carrier where the ePDCCH is, an operation of detecting a control area bearing a physical downlink control channel, whether the control area bearing the physical downlink control channel exists on the component carrier where the ePDCCH is or whether the UE corresponding to the ePDCCH performs, in the component carrier where the ePDCCH is, an operation of detecting the physical control format indication channel, are taken as the judgement conditions for the start position, improving the accuracy and flexibility for determining the start position, thus reducing intra-cell interference in the control channels and improving the frequency spectrum efficiency.

Preferably, the value of the first high-level signaling comprises: if a system bandwidth of the component carrier is smaller than or equal to 10 physical resource blocks, the value of the high-level signaling is one of the following: #0, #1, #2, #3; #0, #2, #3, #4; or #1, #2, #3, #4; or if the system bandwidth of the component carrier is greater than 10 physical resource blocks, the value of the high-level signaling is: #0, #1, #2, or #3.

Preferably, the value of the second high-level signaling comprises: if the system bandwidth of the component carrier is smaller than or equal to 10 physical resource blocks, the high-level signaling indicates the start position to be #2, #3, #4, or the start position is obtained via control format indication information carried on the physical downlink control format indication channel; and if the system bandwidth of the component carrier is greater than 10 physical resource blocks, the high-level signaling indicates the start position to be #1, #2, #3, or the start position is obtained via control format indication information carried by the physical downlink control format indication channel.

Preferably, if the ePDCCH is in the first time slot, an end position of the ePDCCH is the last OFDM symbol in the first time slot or the last OFDM symbol in the second time slot. In this preferred embodiment, the end position of the ePDCCH is defined, so that the accuracy of sending the ePDCCH is improved.

Preferably, if the ePDCCH is only in the second time slot, an end position of the ePDCCH is the last OFDM symbol in the second time slot. In this preferred embodiment, the end position of the ePDCCH is defined, being able to improve the accuracy of sending the ePDCCH.

In another embodiment, the sending software for ePDCCH is also provided, the software is used for executing the technical solutions described in the above-mentioned embodiment and preferred embodiments.

In another embodiment, a storage media is also provided, the above-mentioned sending software for ePDCCH is stored in the storage media; the storage media comprises but is not limited to: an optical disk, floppy disk, hard disk, erasable memory, etc.

A sending apparatus for ePDCCH is also provided in an embodiment of the present disclosure, the sending apparatus for ePDCCH can be used to realize the above-mentioned sending method for ePDCCH and preferred embodiments; what has already been stated will not be described any more, the modules related in the sending apparatus for ePDCCH will be described below. The term "module" used hereinafter can realize combinations of software and/or hardware having predetermined functions. Although the system and method described in the following embodiments are well implemented with software, implementation with hardware or a combination of software and hardware may be conceived.

Figure 7:
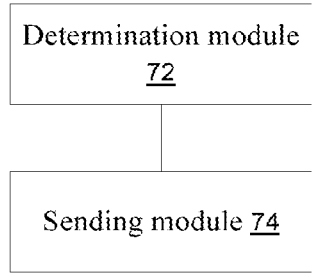
FIG. 7 is a structural block diagram of a sending apparatus for ePDCCH according to an embodiment of the present disclosure.

FIG. 7 is a structural block diagram of a sending apparatus for ePDCCH according to an embodiment of the present disclosure. As shown in FIG. 7, the apparatus comprises: a first determination module 72 and a sending module 74, and the above-mentioned structure will be described in detail below.

The first determination module 72 is configured to determine a start position of the ePDCCH in a subframe according to a high-level signaling and/or a preset rule; and the sending module 74, connected to the first determination module 72, is configured to send a pilot signal for the ePDCCH and data carried on the ePDCCH.

Figure 8:
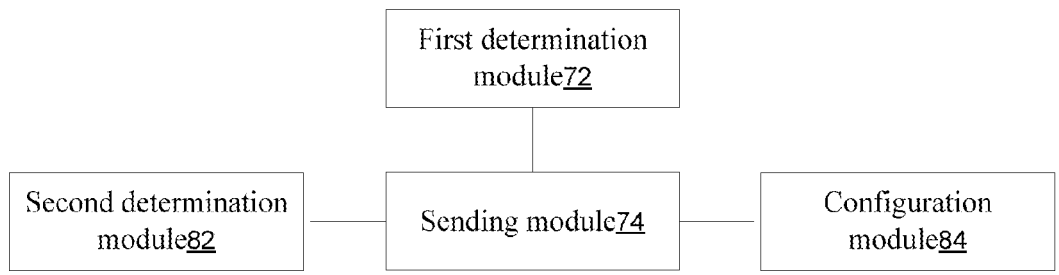
FIG. 8 is a preferred structural block diagram of a sending apparatus for ePDCCH according to an embodiment of the present disclosure.

FIG. 8 is a preferred structural block diagram of a sending apparatus for ePDCCH according to an embodiment of the present disclosure. As shown in FIG. 8, the apparatus comprises: a second determination module 82 and a configuration module 84, and the above-mentioned structure will be described in detail below.

The second determination module, connected to the sending module 74, is configured to determine the pilot signal for the ePDCCH according to at least one of the following: a transmission scheme of the ePDCCH, a type of the subframe where the ePDCCH is, wherein the transmission scheme comprises: a transmit diversity scheme, and a single-antenna port or multi-antenna port transmission scheme; and the configuration module 84, connected to the sending module 74, is configured to configure data power on the at least one sub-carrier element at the antenna port.

It should be noted that in the following embodiments, the new physical downlink control channel is the enhanced physical downlink control channel (ePDCCH).

Preferred Embodiment 1

A sending method for downlink control channel is provided in this embodiment. In this embodiment, the new physical downlink control channel (ePDCCH) adopts two transmission schemes, wherein one scheme is a transmit diversity scheme, and the other scheme is a single-antenna port or multi-antenna port transmission scheme.

In this embodiment, sending downlink control channel comprises: a pilot signal for the new physical downlink control channel is determined and a start position of the ePDCCH in a subframe during a first time slot is determined.

For determining the pilot signal of the new physical downlink control channel (ePDCCH), the determination can be performed by the following methods:

method 1: if the new physical downlink control channel is in the transmit diversity scheme and the new physical downlink control channel is transmitted on a predetermined subframe on a compatible component carrier, a cell-specific reference signal is the pilot signal for the new physical downlink control channel, wherein the predetermined subframe comprises: a non-MBSFN subframe and non-special subframe. If the new physical downlink control channel is transmitted on the MBSFN subframes on the compatible component carrier, or the new physical downlink control channel is transmitted on a non-compatible carrier subframe having no cell-specific reference signal, the UE-specific reference signal is the pilot signal for the new physical downlink control channel.

Method 2: if the new physical downlink control channel is in the single-antenna port or multi-antenna port transmission scheme, the UE-specific reference signal is the pilot signal for the new physical downlink control channel.

Preferably, the UE-specific reference signal is a reference signal of antenna port 7, antenna port 8, or a reference signal of antenna port 7, antenna port 8, antenna port 9, antenna port 10, or a shortened cell-specific reference signal, wherein the shortened cell-specific reference signal is a cell-specific reference signal contained by a physical resource block where the ePDCCH is, when it is according to the cell-specific reference signal.

Preferably, an initial scrambling code value generated by the sequences of the UE-specific reference signal is a predetermined value or is configured according to a high-level signaling, for example, it can be configured as a fixed value 0 or 1.

In this embodiment, the method further comprises configuring the data power of the physical downlink control channel, wherein configuring the data power of the physical downlink control channel comprises the following five methods:

method 1: a ratio of the data power, which is corresponding to the new physical downlink control channel, on at least one the sub-carrier element at an antenna port x to the pilot power, which is corresponding to the new physical downlink control channel, on the sub-carrier element is h1, and the value of h1 is configured by a high-level signaling.

method 2: when the new physical downlink control channel is in single-antenna port or multi-antenna port transmission scheme, the ratio of the data power, which is corresponding to the new physical downlink control channel, on the sub-carrier element at antenna port x to the pilot power, which is corresponding to the new physical downlink control channel, on the sub-carrier element at antenna port x is h1, and h1 is a predefined value.

Method 3: if the new physical downlink control channel is in transmit diversity scheme, the UE-specific reference signal is a shortened cell-specific reference signal, a subframe, where the new physical downlink control channel is, is an MBSFN subframe, and a cell-specific reference signal exists on the first two OFDM symbols of the subframe, the data power, which is corresponding to the new physical downlink control channel, on at least one sub-carrier element at antenna port x is equal to the data power, which is corresponding to the physical downlink shared channel of the user, on the sub-carrier element at antenna port x, and the power of the shortened cell-specific reference signal is the same as that of the corresponding cell-specific reference signal.

Method 4: if the new physical downlink control channel is in transmit diversity scheme, the UE-specific reference signal is a shortened cell-specific reference signal, the subframe, where the new physical downlink control channel is, is an MBSFN subframe, and a cell-specific reference signal exists on the first two OFDM symbols of the subframe, the ratio of the data power, which is corresponding to the new physical downlink control channel, on the sub-carrier element at antenna port x to the pilot power, which is corresponding to the new physical downlink control channel, on the sub-carrier element at antenna port x is h1, the power of the shortened cell-specific reference signal and the power of the corresponding cell-specific reference signal is h2; h1 and h2 are configured by signalings; or h1 is a predetermined value, and h2 is configured by a high-level signaling; or h1 is configured by a signaling, and h2 is a predefined value.

Method 5: when the new physical downlink control channel is in transmit diversity scheme, and the UE-specific reference signal is a shortened cell-specific reference signal; and when no cell-specific reference signal is on at least one subframe where the new physical downlink control channel is, h1 is a predefined value.

For determining a start position of ePDCCH in the first time slot in a subframe, the following methods can be adopted: the start position of the new physical downlink control channel in the first time slot which is in the subframe is configured by a high-level signaling, or obtained according to a physical downlink control format indication channel.

In the preferred implement, the following methods can be used:

method 1: if the component carrier, where the new physical downlink control channel is, is not configured with a control area bearing the physical downlink control channel, the start position is configured by a high-level signaling.

Preferably, when the system bandwidth of the component carrier is smaller than or equal to 10 physical blocks, the value of the high-level signaling is #0, #1, #2, #3; or the value of the high-level signaling is #0, #2, #3, #4; or the value of the high-level signaling is #1, #2, #3, #4.

Preferably, if the system bandwidth of the component carrier is greater than 10 physical resource blocks, the value of the high-level signaling is: #0, #1, #2, #3.

Method 2: if the component carrier, where the new physical downlink control channel is, is configured with a control area bearing the physical downlink control channel, the start position is a predetermined value configured by a high-level signaling, or is obtained from the physical downlink control format indication channel according to a high-level signaling indication.

Preferably, in this method: if the system bandwidth of the component carrier is smaller than or equal to 10 physical resource blocks, the high-level signaling is 2 bits, indicating #2, #3, #4, or the start position is obtained via control format indication information carried on the physical downlink control format indication channel.

Preferably, in this method: if the system bandwidth of the component carrier is greater than 10 physical resource blocks, the high-level signaling is 2 bits, indicating #1, #2, #3, or obtained via control format indication information carried by the physical downlink control format indication channel.

Figure 4:
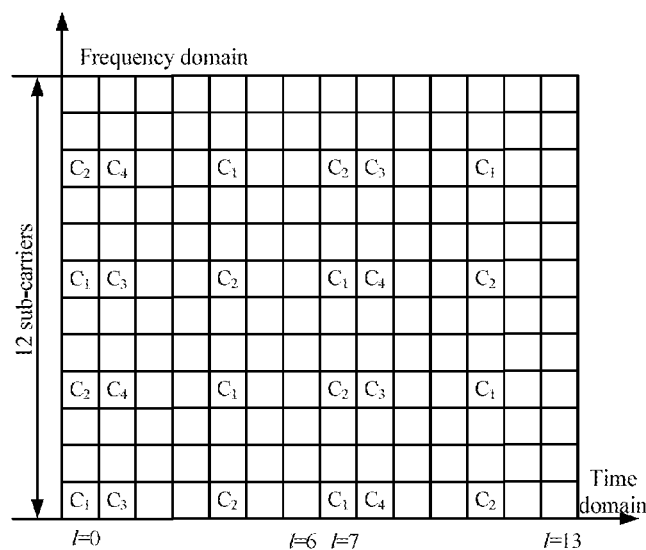
FIG. 4 is a schematic diagram of CRS positions in the physical resource blocks if a cyclic prefix is a normal cyclic prefix in related art.
Figure 5:
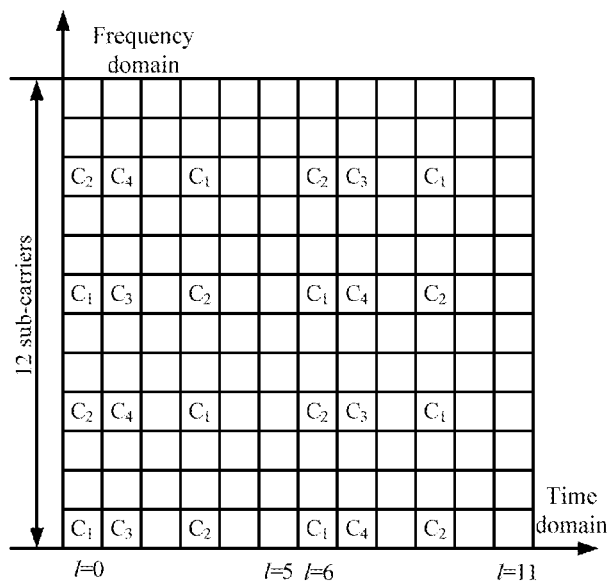
FIG. 5 is a schematic diagram of CRS positions in the physical resource blocks if a cyclic prefix is an extended cyclic prefix in related art.
Figure 6:
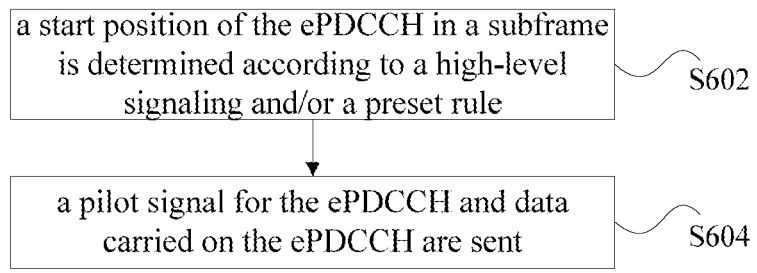
FIG. 6 is a flowchart of a sending method for ePDCCH according to an embodiment of the present disclosure.

In the related art, since there is only a part of CRS or no CRS in the MBSFN subframe and Additional Carrier Type, diversity cannot be well supported. As a result, the following problem exists: in an MBSFN subframe, since only the CRS of the first two symbols are sent as shown in FIG. 4 and FIG. 5, the diversity performance is terrible, and it is generally considered that the diversity technique is not supported here. Additional Carrier Type also does not support the diversity technique.

Moreover, for PDSCH transmission, the MBSFN does not support diversity, and then it can be scheduled in the non-MBSFN subframe. This means is feasible for a data channel. However, this restriction still exists in control signaling transmission in the new control channel, and has great influence on the control channel.

Figure 9:
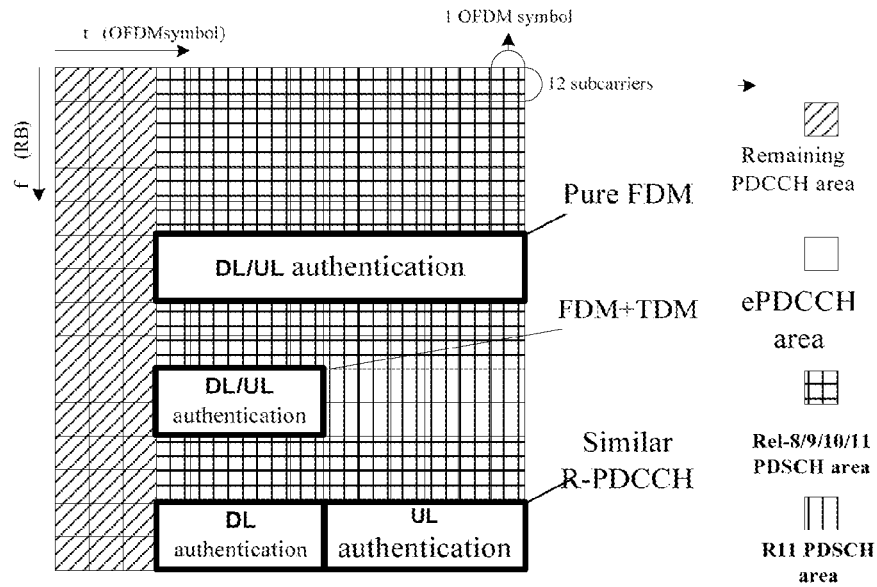
FIG. 9 is a schematic diagram of the design of ePDCCH according to an embodiment of the present disclosure.

The design of the new control channel is as shown in FIG. 9 below, if the new control channel (ePDCCH) is transmitted in the above-mentioned area, as not being able to obtain demodulation support for the CRS in the MBSFN subframe, the control signaling cannot be transmitted on the ePDCCH using the transmit diversity scheme. In this way unnecessary limitations will be brought about, with the interference being small and the transmission condition being good on the ePDCCH.

Figure 10:
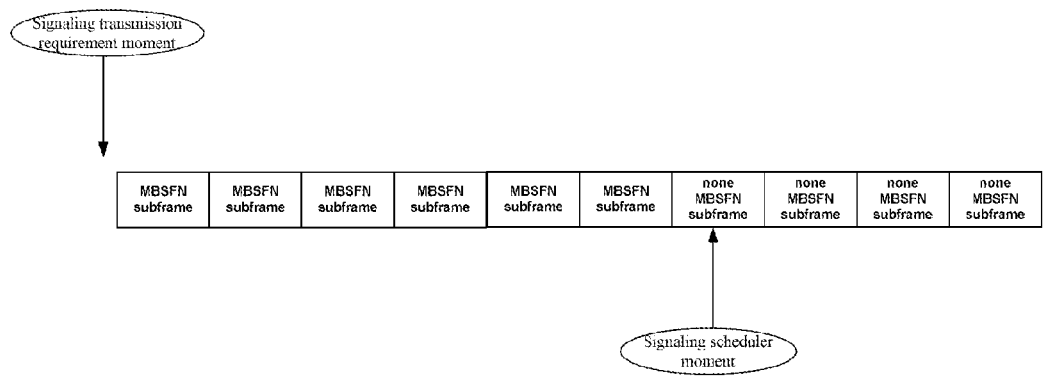
FIG. 10 is a schematic diagram of signaling delay according to an embodiment of the present disclosure.

In addition, as the control signaling with respect to the data, as shown in FIG. 10, some signalings have very high requirement on delay, therefore, restriction on scheduling might result in great time delay.

Since MBSFN applications will be more and more, and more appropriate for the MIMO technique and coordinated multi-point technique, it will generally be greater than the non-MBSFN subframe number, and the above-mentioned scheduling restriction will be more and more apparent.

LTE-A (evolved LTE), as an evolved system of LTE, can provide a frequency spectrum bandwidth up to 100 MHz, supports communication which is more flexible and has higher quality, and the LTE-A system has very good backward compatibility at the same time. There are a plurality of component carriers (CC for short) in the LTE-A system; and one LTE terminal can only work on a certain backward compatible CC, and an LTE-A terminal having strong capability can transmit signals on a plurality of CCs simultaneously. That is, it is realized that a terminal of LTE-A transmits and receives data on a plurality of component carriers, thus reaching the object of improving bandwidth. This technique is called carrier aggregation technique. For some non-compatible carriers, the original physical control channel area may not exist; and the subframe of the non-compatible carrier may have no cell-specific reference signal.

By the technical solution of the preferred embodiment, in the MBSFN subframe, the antenna diversity technique is used in the new downlink control channel, or if no CRS in the subframe, the transmission performance of the new downlink control channel in a high-speed scenario is also ensured, ensuring the downlink resource use efficiency and reducing intra-cell interference in the control channel.

Preferred Embodiment 2

A sending method for ePDCCH is provided in this embodiment. In this embodiment, two transmission schemes of a new physical downlink control channel are defined, one is transmit diversity scheme, and the other is single-antenna port or multi-antenna port transmission scheme.

The method for determining the pilot signal in this embodiment comprises the following methods:

method 1: if the new physical downlink control channel is in transmit diversity scheme, if the new physical downlink control channel is transmitted on an ordinary subframe on the compatible component carrier, a cell-specific reference signal is a pilot signal for the new physical downlink control channel; and if the new physical downlink control channel is transmitted on MBSFN subframes on the compatible component carrier, or if the new physical downlink control channel is transmitted on at least one non-compatible carrier subframe having no cell-specific reference signal, a UE-specific reference signal is the pilot signal of the new physical downlink control channel.

Method 2: if the new physical downlink control channel is in single-antenna port or multi-antenna port transmission scheme, the UE-specific reference signal is the pilot signal for the new physical downlink control channel.

The above-mentioned UE-specific reference signal is a reference signal of antenna port 7, antenna port 8, or a reference signal of antenna port 7, antenna port 8, antenna port 9, antenna port 10, or a shortened cell-specific reference signal, wherein the shortened cell-specific reference signal is a cell-specific reference signal contained in the physical resource blocks where the new physical downlink control channel is, when it is sent in the subframe according to the cell-specific reference signal.

The positions of the UE-specific pilot of the new downlink control channel (the shortened cell-specific reference signal) are as shown in FIG. 11 to FIG. 20.

Figure 11:
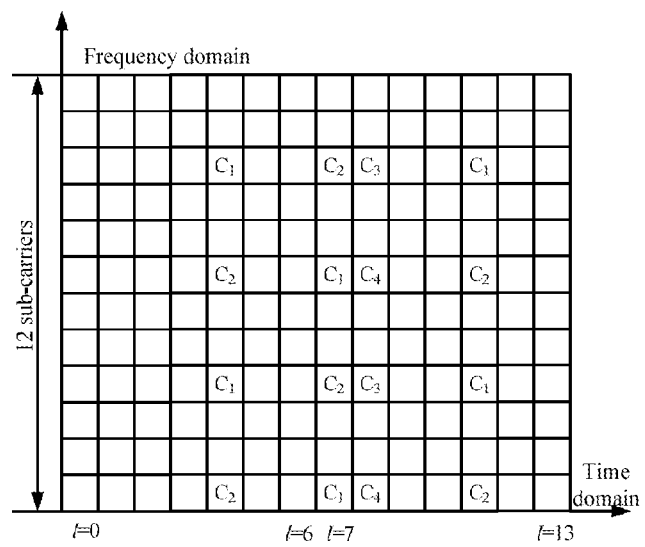
FIG. 11 is a first schematic diagram of pilot positions of the ePDCCH if a subframe has a normal cyclic prefix according to an embodiment of the present disclosure.
Figure 12:
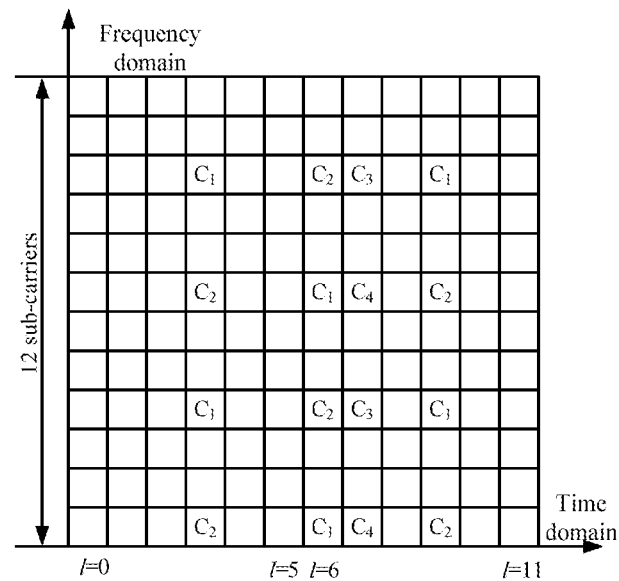
FIG. 12 is a second schematic diagram of pilot positions of ePDCCH if a subframe has a normal cyclic prefix according to an embodiment of the present disclosure.

When the subframe is configured as a normal cyclic prefix, start OFDM symbols of the new downlink control channel are OFDM symbols #2, #3, #4 in the first time slot which is in the subframe, and if an end position is the last OFDM symbol in the subframe, the pilot position of the new downlink control channel is as shown in FIG. 11. When the subframe is configured as an extended cyclic prefix, the start OFDM symbols of the new downlink control channel are OFDM symbol #2, #3 in the first time slot which is in the subframe, and the end position is the last OFDM symbol in the subframe, the pilot position of the new downlink control channel is as shown in FIG. 12.

Figure 13:
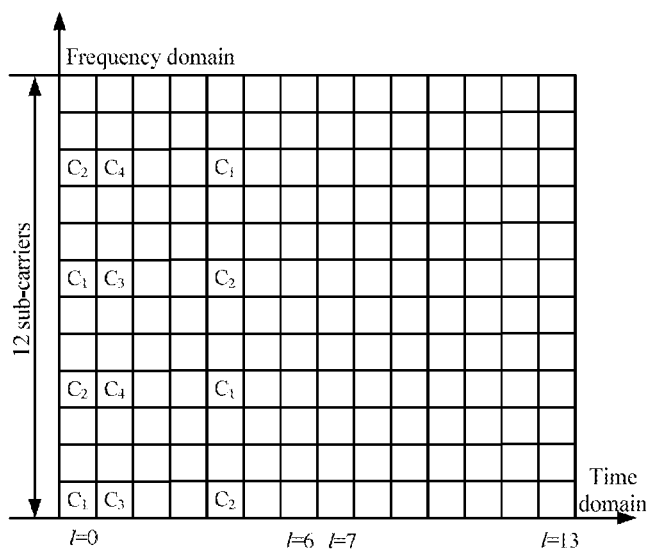
FIG. 13 is a third schematic diagram of pilot positions of ePDCCH if a subframe has a normal cyclic prefix according to an embodiment of the present disclosure.
Figure 14:
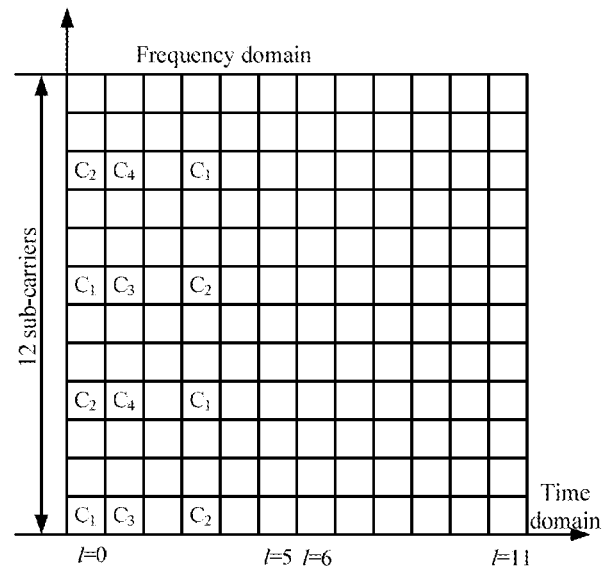
FIG. 14 is a fourth schematic diagram of pilot positions of ePDCCH if a subframe has a normal cyclic prefix according to an embodiment of the present disclosure.
Figure 15:
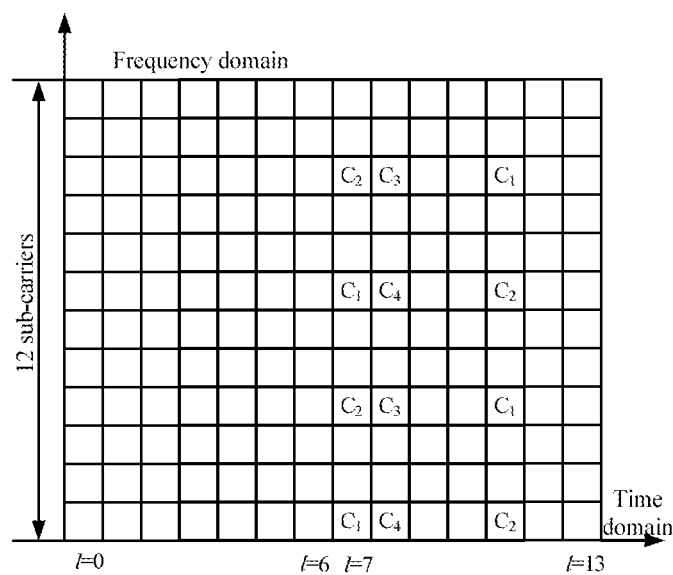
FIG. 15 is a fifth schematic diagram of pilot positions of ePDCCH if a subframe has a normal cyclic prefix according to an embodiment of the present disclosure.
Figure 16:
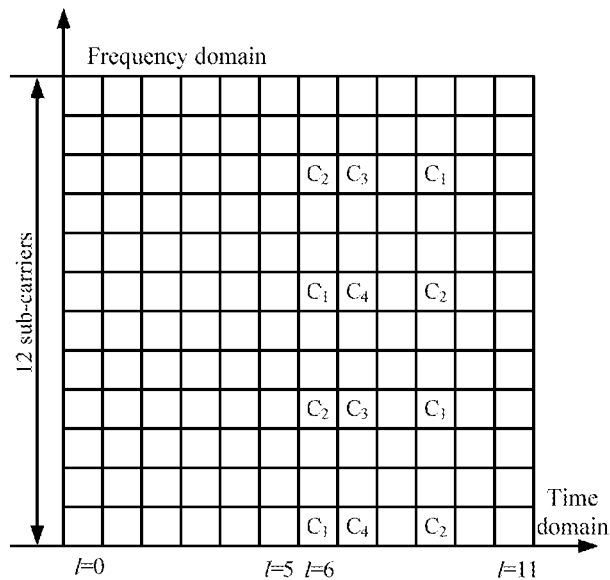
FIG. 16 is a sixth schematic diagram of pilot positions of ePDCCH if a subframe has a normal cyclic prefix according to an embodiment of the present disclosure.
Figure 17:
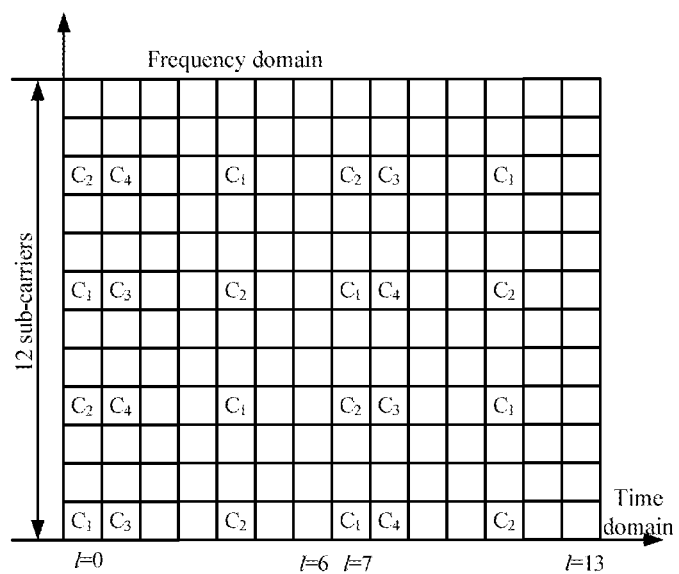
FIG. 17 is a seventh schematic diagram of pilot positions of ePDCCH if a subframe has a normal cyclic prefix according to an embodiment of the present disclosure.
Figure 18:
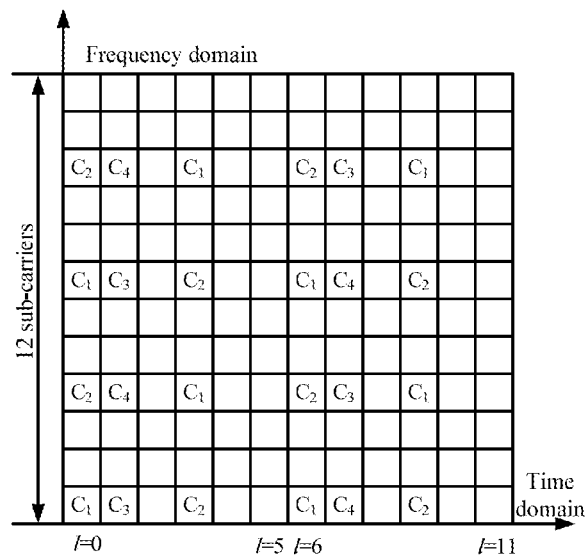
FIG. 18 is an eighth schematic diagram of pilot positions of ePDCCH if a subframe has a normal cyclic prefix according to an embodiment of the present disclosure.
Figure 19:
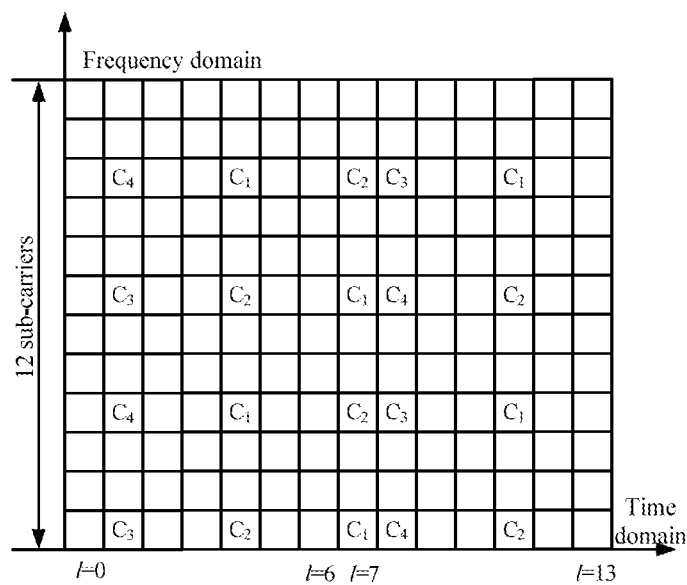
FIG. 19 is a ninth schematic diagram of pilot positions of ePDCCH if a subframe has a normal cyclic prefix according to an embodiment of the present disclosure.
Figure 20:
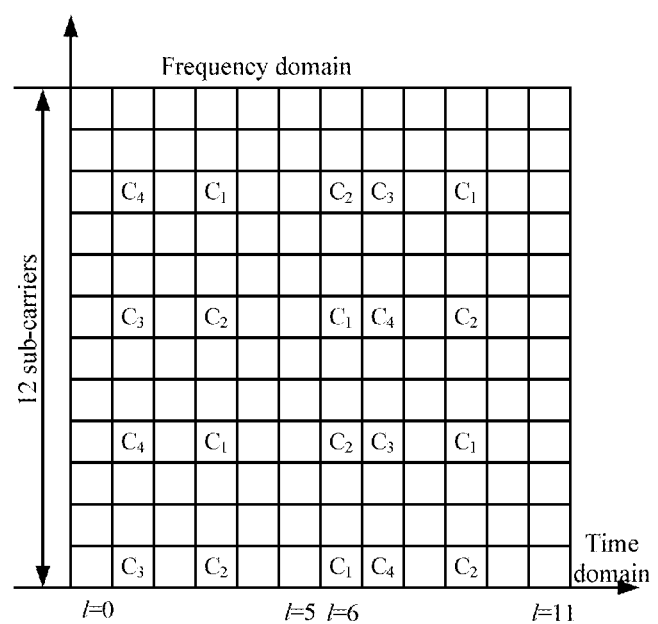
FIG. 20 is a tenth schematic diagram of pilot positions of ePDCCH if a subframe has a normal cyclic prefix according to an embodiment of the present disclosure.

When the start OFDM symbol of the new downlink control channel is the first OFDM symbol in the subframe, and the end position is the last OFDM symbol of the first time slot in the subframe, the pilot position of the new downlink control channel is as shown in FIG. 13 and FIG. 14; when the start OFDM symbol of the new downlink control channel is the first OFDM symbol of the second time slot in the subframe, and the end position is the last OFDM symbol of the second time slot in the subframe, the pilot position of the new downlink control channel is as shown in FIG. 15 and FIG. 16; when the start OFDM symbol of the new downlink control channel is the first OFDM symbol in the subframe, and the end position is the last OFDM symbol in the subframe, the pilot position of the new downlink control channel is as shown in FIG. 17 and FIG. 18; and when the start OFDM symbol of the new downlink control channel is the second OFDM symbol in the subframe, and the end position is the last OFDM symbol in the subframe; and the pilot position of the new downlink control channel is as shown in FIG. 19 and FIG. 20.

Method 3: the pilot position of the new downlink control channel is in a UE-specific configuration mode, i.e. the pilot signal is only transmitted on a physical resource block, where the new downlink control channel is, in multi-antenna transmit diversity scheme.

Method 4: the pilot position of the new downlink control channel is in cell-specific configuration mode, i.e. the pilot signal is transmitted on physical resource blocks configured by a base station; and the new control channel transmitted on the physical resource block adopts multi-antenna transmit diversity scheme;

It should be note that the transmission scheme of the new downlink control channel and the corresponding physical downlink shared channel can be the same, and can also be different.

Preferred Embodiment 3

A power configuration method for ePDCCH is provided in this embodiment, and in this embodiment, the power of the ePDCCH can be determined by the following methods.

Method 1

The ratio of the data power, which is corresponding to the new physical downlink control channel, on the sub-carrier element at antenna port x to the pilot power, which is corresponding to the new physical downlink control channel, on sub-carrier element at antenna port x is h1, and the value of h1 is configured by high-level signalings; for example: 1/2, 1/4, or 2, 1, 1/2, 1/4, or 2, 1, or 2, 4, or 1, 2, 4, etc.;

Method 2 when the new physical downlink control channel is in single-antenna port or multi-antenna port transmission scheme, h1 is a predefined value, for example, 1 when being a single-antenna port, 2 when being a two-antenna port, 2 when being a four-antenna port, or fixed to be 2, or fixed to be 1;

Method 3 when the new physical downlink control channel is in transmit diversity scheme, and the UE-specific reference signal is a shortened cell-specific reference signal; and when the subframe, where the new physical downlink control channel is, is an MBSFN subframe, and a cell-specific reference signal exists on the first two OFDM symbols in the subframe; the data power, which is corresponding to the new physical downlink control channel, on the sub-carrier element at antenna port x is equal to the pilot power, which is corresponding to the physical downlink shared channel, on the sub-carrier element at antenna port x, and the powers of the shortened cell-specific reference signal and the corresponding cell-specific reference signal are the same;

Method 4 when the new physical downlink control channel is in transmit diversity scheme, and the UE-specific reference signal is a shortened cell-specific reference signal; and when the subframe, where the new physical downlink control channel is, is an MBSFN subframe, and a cell-specific reference signal exists on the first two OFDM symbols in the subframe; the power of the shortened cell-specific reference signal and the power of corresponding cell-specific reference signal are h2, and h1 and h2 are configured by signalings; or h1 is a predetermined value, and h2 is configured by a high-level signaling; or h1 is configured by a signaling, and h2 is a predefined value;

for example, the configuration signaling can be 1/2, 1/4, or 2, 1, 1/2, 1/4, or 2, 1, or 2, 4, or 1, 2, 4, etc., and the predetermined value is 1 when being a single-antenna port, is 2 when being a two-antenna port, and 2 when being a four-antenna port, or is fixed to be 2, or is fixed to be 1; and Method 5 when the new physical downlink control channel is in transmit diversity scheme, and the UE-specific reference signal is a shortened cell-specific reference signal; and when no cell-specific reference signal is on a subframe where the new physical downlink control channel is, h1 is a predefined value.

Preferred Embodiment 4

A method for determining a start position of ePDCCH within a first time slot in a subframe is provided in this embodiment; the start position can be configured by a high-level signaling, or obtained according to a physical downlink control format indication channel.

Scenario 1

When the component carrier, where the new physical downlink control channel is, is not configured with a control area bearing the physical downlink control channel, the start position is configured by a high-level signaling;

when the system bandwidth of the component carrier is smaller than or equal to 10 physical blocks, the value of the high-level signaling is #0, #1, #2, #3; or the value of the high-level signaling is #0, #2, #3, #4; or the value of the high-level signaling is #1, #2, #3, #4;

for example: when the base station is configured as #4, the time domain start OFDM symbol in the new physical downlink control channel is the OFDM symbol #4 of the first time slot in the subframe; and when the base station is configured as #0, the time domain start OFDM symbol of the new physical downlink control channel is the OFDM symbol #0 of the first time slot in the subframe, i.e. starting from the first OFDM symbol in the subframe; and when the system bandwidth of the component carrier is greater than 10 physical resource blocks, the value of the high-level signaling is: #0, #1, #2, #3;

for example: when the base station is configured as #3, the time domain start OFDM symbol of the new physical downlink control channel is the OFDM symbol #4 of the first time slot in the subframe; and when the base station is configured as #3, the time domain start OFDM symbol of the new physical downlink control channel is the OFDM symbol #0 of the first time slot in the subframe, i.e. starting from the first OFDM symbol in the subframe;

Scenario 2 when the component carrier, where the new physical downlink control channel is, is configured with a control area bearing the physical downlink control channel, the start position is a predetermined value configured by a high-level signaling, or obtained according to the physical downlink control format indication channel which is indicated by a high-level signaling;

when the system bandwidth of the component carrier is smaller than or equal to 10 physical resource blocks, the high-level signaling is 2 bits, indicating #2, #3, #4, or obtained via control format indication information bore by the physical downlink control format indication channel; and when the system bandwidth of the component carrier is greater than 10 physical resource blocks, the high-level signaling is 2 bits, indicating #1, #2, #3, or obtained via control format indication information bore by the physical downlink control format indication channel;

for example: when the base station is configured as #1, the time domain start OFDM symbol in the new physical downlink control channel is the OFDM symbol #1 of the first time slot in the subframe; and when the base station is configured to be obtained according to the physical downlink control format indication channel which is indicated by a high-level signaling; the time domain start OFDM symbol in the new physical downlink control channel is obtained according to control format indication information bore by the physical downlink control format indication channel, when the control format indication information is 1 (the number of the OFDM symbol transmitting the physical downlink control channel is 1, and the downlink control domain is the first OFDM symbol of the subframe), the time domain start OFDM symbol of the new physical downlink control channel is #1 (starting from the second OFDM symbol in the subframe); when the control format indication information is 2 (the number of the OFDM symbol transmitting the physical downlink control channel is 2, and the downlink control domain is the first two OFDM symbols in the subframe), the time domain start OFDM symbol of the new physical downlink control channel is #2 (starting from the third OFDM symbol of the subframe); when the control format indication information is 3 (the number of the OFDM symbol transmitting the physical downlink control channel is 3, and the downlink control domain is the first three OFDM symbols of the subframe), the time domain start OFDM symbol of the new physical downlink control channel is #3 (starting from the fourth OFDM symbol of the subframe); and when the control format indication information is 4 (the number of the OFDM symbol transmitting the physical downlink control channel is 4, and the downlink control domain is the first four OFDM symbols of the subframe), the time domain start OFDM symbol of the new physical downlink control channel is #4 (starting from the fifth OFDM symbol of the subframe);

Scenario 3 when the time domain of the new physical downlink control channel is configured to start with #1 by the high-level signaling, the time domain start OFDM symbol in the first time slot of the new physical downlink control channel is #x; the control area, where the original physical downlink control channel is, is at most 2 OFDM symbols for a downlink special pilot time slot (DwPTS) in a special subframe of a TDD system; similarly, the control area, where the original physical downlink control channel is, is at most 2 OFDM symbols on the MBSFN subframe; in the above-mentioned two situations, the time domain start OFDM symbol in the first time slot of the subframe for the new physical downlink control channel is #x; or when x is greater than or equal to 2, in the above-mentioned two situations, the time domain start OFDM symbol in the first time slot of the subframe for the new physical downlink control channel is #2.

Scenario 4

When the ePDCCH is only in the second time slot, a start position of the ePDCCH is the first OFDM symbol in the second time slot and an end position of the ePDCCH is the last OFDM symbol in the second time slot.

Scenario 5

When the ePDCCH is in the first time slot, the start position of the ePDCCH is the same as a start position of a specific physical downlink shared channel (PDSCH) of a first user equipment (UE) on a first component carrier, wherein the first component carrier is a component carrier where the ePDCCH is, and the first UE is a UE corresponding to the ePDCCH;

for example, when the PDSCH of the UE is scheduled by PDCCH of another component carrier, the start position of the PDSCH is indicated by a high-level signaling; if the start position is configured as the OFDM symbol #2 of the first time slot, the start position corresponding to the UE on the component carrier, where the PDSCH is, is the OFDM symbol #2 of the first time slot.

When the PDSCH of the UE is scheduled by PDCCH of the component carrier where the PDSCH is, the start position of the PDSCH is indicated by format information about the physical control format indication channel; if the format information about the physical control format indication information indicates the OFDM symbol #1 of the first time slot, the start position of ePDCCH corresponding to the UE on the component carrier, where the PDSCH is, is the OFDM symbol #1 of the first time slot.

By means of the above-mentioned embodiment, a sending method and apparatus for ePDCCH is provided. By the above-mentioned methods in this embodiment, it is enabled that in the MBSFN subframe, the new downlink control channel uses the antenna diversity technique, and when there is no CRS in the subframe, the new downlink control channel uses the antenna diversity technique; the transmission performance of the new downlink control channel in a high-speed scenario is ensured, and the start position of the downlink control channel is flexibly configured, ensuring the downlink resource use efficiency and reducing interference of the control channel between cells. It should be noted that these technical effects are not possessed by all of the above-mentioned embodiments, and these technical effects can be obtained by certain preferred embodiments.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, and the disclosure may have various changes and variations. Any amendments, equivalent substitutions, improvements, etc. within the principle of the disclosure are all included in the scope of the protection of the disclosure.

What is claimed is:

1. A sending method for enhanced Physical Downlink Control Channel (ePDCCH), comprising:
    determining, by a base station, a start position of the ePDCCH in a subframe according to at least one of a high-level signaling and a preset rule, wherein the high-level signalling or the preset rule comprises one of:
        (i) if the ePDCCH is only in a second time slot, the start position of the ePDCCH is a first Orthogonal Frequency Division Multiplexing (OFDM) symbol of the second time slot,
        (ii) if the ePDCCH is only in a first time slot, the start position of the ePDCCH is a same as a start position of a first component carrier of a specific Physical Downlink Shared Channel (PDSCH) for a first User Equipment (UE), wherein the first component carrier is a component carrier where the ePDCCH is and the first UE is a UE corresponding to the ePDCCH,
        (iii) if the ePDCCH is in the first time slot, the start position of the ePDCCH is obtained according to a first high-level signalling, and
        (iv) if the ePDCCH is in the first time slot, the start position of the ePDCCH is obtained according to a first high-level signalling when a first predetermined condition is satisfied, and the start position of the ePDCCH is obtained according to a second high level signalling when a second predetermined condition is satisfied; and
    sending, by the base station, a pilot signal for the ePDCCH and data carried on the ePDCCH,
    wherein the first predetermined condition and the second predetermined condition comprise one of the following:
        the first predetermined condition being that the UE corresponding to the ePDCCH does not perform, in the component carrier where the ePDCCH is, an operation of detecting a control area bearing a physical downlink control channel and the second predetermined condition being that the UE corresponding to the ePDCCH performs, in the component carrier where the ePDCCH is, the operation of detecting the control area bearing the physical downlink control channel,
        the first predetermined condition being that no control area bearing the physical downlink control channel is on the component carrier where the ePDCCH is and the second predetermined condition being that a control area bearing the physical downlink control channel is on the component carrier where the ePDCCH is, and the first predetermined condition being that the UE corresponding to the ePDCCH does not perform, in the component carrier where the ePDCCH is, an operation of detecting a physical control format indication channel, and the second predetermined condition being that the UE corresponding to the ePDCCH performs, in the component carrier where the ePDCCH is, the operation of detecting a physical control format indication channel.

2. The method according to claim 1, wherein before sending, by the base station, the pilot signal for the ePDCCH, the method further comprises: determining, by the base station, the pilot signal for the ePDCCH according to at least one of the following:

a transmission scheme of the ePDCCH and a type of the subframe where the ePDCCH is, wherein the transmission scheme comprises: a transmit diversity scheme, and a single-antenna port or multi-antenna port transmission scheme.

3. The method according to claim 2, wherein determining the pilot signal for the ePDCCH according to the at least one of the following: the transmission scheme of the ePDCCH and the type of the subframe where the ePDCCH is comprises at least one of the following:

if the transmission scheme of the ePDCCH is the transmit diversity scheme, determining, by the base station, a cell-specific reference signal as the pilot signal for the ePDCCH;

if the transmission scheme of the ePDCCH is the single-antenna port or multi-antenna port transmission scheme, determining, by the base station, a UE-specific reference signal as the pilot signal for the ePDCCH;

if the type of the subframe where the ePDCCH is an Multicast Broadcast Single Frequency Network (MBSFN) subframe, determining, by the base station, the UE-specific reference signal as the pilot signal for the ePDCCH;

if the type of the subframe where the ePDCCH is a predetermined subframe, determining, by the base station, the cell-specific reference signal as the pilot signal for the ePDCCH, wherein the predetermined subframe comprises: a non-MBSFN subframe and non-special subframe;

if the transmission scheme of the ePDCCH is the transmit diversity scheme and the ePDCCH is transmitted on the predetermined subframe on a compatible component carrier, determining, by the base station, the cell-specific reference signal as the pilot signal for the ePDCCH;

if the transmission scheme of the ePDCCH is the transmit diversity scheme and the ePDCCH is transmitted on a non-compatible carrier subframe having no cell-specific reference signal, determining, by the base station, the UE-specific reference signal as the pilot signal for the ePDCCH; and if the transmission scheme of the ePDCCH is the transmit diversity scheme and the ePDCCH is transmitted on MBSFN subframes on a compatible component carrier, determining, by the base station, the UE-specific reference signal as the pilot signal for the ePDCCH.

4. The method according to claim 3, wherein the UE-specific reference signal is one of the following: a reference signal supporting a two-antenna port, a reference signal supporting a four-antenna port, a shortened cell-specific reference signal, wherein the shortened cell-specific reference signal is the cell-specific reference signal contained in at least one physical resource block where the ePDCCH is when sending the cell-specific reference signal.

5. The method according to claim 3, wherein an initial scrambling code value generated by sequences of the UE-specific reference signal is a predetermined value or is configured according to a high-level signaling.

6. The method according to claim 1, wherein before sending, by the base station, data carried on the ePDCCH, the method further comprises: configuring, by the base station, data power on at least one sub-carrier element at an antenna port.

7. The method according to claim 6, wherein configuring, by the base station, the data power on the at least one sub-carrier element at the antenna port comprises one of the following:

configuring, by the base station, a ratio of the data power on the at least one sub-carrier element at the antenna port to pilot power, which is corresponding to the antenna port, on the at least one sub-carrier element to be h1, wherein the value of h1 is configured by a high-level signaling;

if the ePDCCH is in the single-antenna port or multi-antenna port transmission scheme, configuring, by the base station, the ratio of the data power on the at least one sub-carrier element at the antenna port to the pilot power, which is corresponding to the antenna port, on the at least one sub-carrier element, to be h1, wherein h1 is a predetermined value;

configuring, by the base station, the data power on the at least one sub-carrier element at the antenna port to be equal to the pilot power, which is corresponding to the antenna port, on the sub-carrier element, if the following conditions are satisfied: the ePDCCH is in the transmit diversity scheme, the UE-specific reference signal is a shortened cell-specific reference signal, the subframe, where the ePDCCH is, is the MBSFN subframe, and the cell-specific reference signal exists on the first two Orthogonal Frequency Division Multiplexing (OFDM) symbols of the MBSFN subframe;

if the following conditions are satisfied, configuring, by the base station, the ratio of the data power on the sub-carrier element at the antenna port to the pilot power, which is corresponding to the antenna port, on the sub-carrier element to be h1, and configuring power of the shortened cell-specific reference signal and power of a corresponding cell-specific reference signal to be h2, wherein h1/h2 represent a power ratio and h1 and h2 are configured by one of the following means: h1 and h2 being configured by a signaling; h1 being the predetermined value, h2 being configured by a high-level signaling; and h1 being configured by a signaling, and h2 being a predefined value;

configuring, by the base station, the ratio of the data power on the sub-carrier element at the antenna port to the pilot power, which is corresponding to the antenna port, on the sub-carrier element to be h1, which is a predefined value or is configured by the high-level signaling, if the following conditions are satisfied: the ePDCCH is in the transmit diversity scheme, the UE-specific reference signal is a shortened cell-specific reference signal, and no cell-specific reference signal is on the subframe where the ePDCCH is.

8. The method according to claim 1, wherein the value of the first high-level signaling comprises:

if a system bandwidth of the component carrier is smaller than or equal to 10 physical resource blocks, the value of the high-level signaling is one of the following: #0, #1, #2, #3; #0, #2, #3, #4; or #1, #2, #3, #4; and if the system bandwidth of the component carrier is greater than 10 physical resource blocks, the value of the high-level signaling is: #0, #1, #2, or #3, wherein # represents a number.

9. The method according to claim 1, wherein the value of the second high-level signaling comprises:

if the system bandwidth of the component carrier is smaller than or equal to 10 physical resource blocks, the high-level signaling indicates the start position of the ePDCCH to be #2, #3, #4, or the start position of the ePDCCH is obtained via control format indication information carried by a physical downlink control format indication channel; and if the system bandwidth of the component carrier is greater than 10 physical resource blocks, the high-level signaling indicates the start position of the ePDCCH to be #1, #2, #3, or the start position of the ePDCCH is obtained via control format indication information carried by the physical downlink control format indication channel, wherein # represents a number.

10. The method according to claim 1, wherein if the ePDCCH is in the first time slot, an end position of the ePDCCH is the last OFDM symbol in the first time slot or the last OFDM symbol in the second time slot.

11. The method according to claim 1, wherein if the ePDCCH is only in the second time slot, an end position of the ePDCCH is the last OFDM symbol of the second time slot.

12. A sending apparatus for enhanced physical downlink control channel (ePDCCH), comprising:

a hardware processor configured with a memory;

a plurality of program modules stored in the memory, executable by the hardware processor, wherein the program modules comprise:

a first determination module configured to determine a start position of the ePDCCH in a subframe according to at least one of high-level signaling and a preset rule, wherein the high-level signalling or the preset rule comprises one of:

(i) if the ePDCCH is only in a second time slot, the start position of the ePDCCH is a first Orthogonal Frequency Division Multiplexing (OFDM) symbol of the second time slot, (ii) if the ePDCCH is only in a first time slot, the start position of the ePDCCH is a same as a start position of a first component carrier of a specific Physical Downlink Shared Channel (PDSCH) for a first User Equipment (UE), wherein the first component carrier is a component carrier where the ePDCCH is and the first UE is a UE corresponding to the ePDCCH, (iii) if the ePDCCH is in the first time slot, the start position of the ePDCCH is obtained according to a first high-level signalling, and (iv) if the ePDCCH is in the first time slot, the start position of the ePDCCH is obtained according to a first high-level signalling when a first predetermined condition is satisfied, and the start position of the ePDCCH is obtained according to a second high level signalling when a second predetermined condition is satisfied; and a sending module configured to send a pilot signal for the ePDCCH and data carried on the ePDCCH, wherein the first predetermined condition and the second predetermined condition comprise one of the following:

the first predetermined condition being that the UE corresponding to the ePDCCH does not perform, in the component carrier where the ePDCCH is, an operation of detecting a control area bearing a physical downlink control channel and the second predetermined condition being that the UE corresponding to the ePDCCH performs, in the component carrier where the ePDCCH is, the operation of detecting the control area bearing the physical downlink control channel, the first predetermined condition being that no control area bearing the physical downlink control channel is on the component carrier where the ePDCCH is and the second predetermined condition being that a control area bearing the physical downlink control channel is on the component carrier where the ePDCCH is, and the first predetermined condition being that the UE corresponding to the ePDCCH does not perform, in the component carrier where the ePDCCH is, an operation of detecting a physical control format indication channel, and the second predetermined condition being that the UE corresponding to the ePDCCH performs, in the component carrier where the ePDCCH is, the operation of detecting a physical control format indication channel.

13. The apparatus according to claim 12, wherein the program modules further comprise:

a second determination module configured to determine the pilot signal for the ePDCCH according to at least one of the following:

a transmission scheme of the ePDCCH and a type of the subframe where the ePDCCH is, wherein the transmission scheme comprises: a transmit diversity scheme and a single-antenna port or multi-antenna port transmission scheme.

14. The apparatus according to claim 12, wherein the program modules further comprise:

a configuration module configured to configure a data power on at least one sub-carrier element at the antenna port.

* * * * *